United States Patent
Haley et al.

(10) Patent No.: US 7,637,420 B2
(45) Date of Patent: Dec. 29, 2009

(54) SELF-SERVICE TERMINAL

(75) Inventors: Marcus Haley, Godalming (GB); Paul Nielsen, London (GB)

(73) Assignee: NCR Corporation, Dayton, OH (US)

( * ) Notice: Subject to any disclaimer, the term of this patent is extended or adjusted under 35 U.S.C. 154(b) by 2046 days.

(21) Appl. No.: 09/848,003

(22) Filed: May 3, 2001

(65) Prior Publication Data

US 2001/0044777 A1 Nov. 22, 2001

(30) Foreign Application Priority Data

May 10, 2000 (GB) .................................. 0011275.5

(51) Int. Cl.
G06Q 40/00 (2006.01)
G06K 5/00 (2006.01)
G06K 15/00 (2006.01)
G06F 19/00 (2006.01)

(52) U.S. Cl. ...................... 235/379; 235/380; 235/383; 235/385; 705/43

(58) Field of Classification Search ............. 705/42–44, 705/1; 235/375, 379, 380, 383, 385; 345/700; 455/557, 406–408, 425
See application file for complete search history.

(56) References Cited

U.S. PATENT DOCUMENTS

| | | |
|---|---|---|
| 4,634,845 A | 1/1987 | Hale et al. |
| 5,616,900 A | 4/1997 | Seewoster |
| 5,787,403 A * | 7/1998 | Randle ......................... 705/43 |
| 5,841,118 A | 11/1998 | East et al. |
| 6,039,247 A | 3/2000 | Reccia et al. |
| 6,164,529 A * | 12/2000 | Peters et al. ................. 235/379 |
| 6,305,603 B1 * | 10/2001 | Grunbok et al. ............. 235/379 |
| 6,334,117 B1 * | 12/2001 | Covert et al. .................. 705/43 |
| 6,999,936 B2 * | 2/2006 | Sehr ............................... 705/5 |
| 7,412,223 B1 * | 8/2008 | Yamamoto et al. .......... 455/403 |

FOREIGN PATENT DOCUMENTS

| | | |
|---|---|---|
| EP | 0661676 | 7/1995 |
| EP | 0 843 292 A2 | 5/1998 |
| EP | 0 933 733 A2 | 8/1999 |
| EP | 0 950 968 A1 | 10/1999 |
| WO | 8203484 | 10/1982 |
| WO | 9007756 | 7/1990 |
| WO | WO 98/54678 A | 12/1998 |

OTHER PUBLICATIONS

Lena Williams; "Hello, Ms. 470-635-1, May I Help You?"; New York Times, Late City Edition ED, Wednesday, May 24, 1989; pp. 1-3.*

* cited by examiner

Primary Examiner—Ella Colbert
(74) Attorney, Agent, or Firm—Gregory A. Welte (57) ABSTRACT

A self-service terminal, such as an ATM (Automated Teller Machine). The ATM has a communication port for interfacing with a user's portable electronic device. The ATM is operable to receive a transaction authorization from the user's portable electronic device, to examine the transaction authorization, and to dispense an item to fulfil a requested transaction associated with the transaction authorization, without the terminal preparing an authorization request to a remote computer.

5 Claims, 5 Drawing Sheets

SELF-SERVICE TERMINAL

BACKGROUND OF THE INVENTION

The present invention relates to a self-service terminal (SST), such as an automated teller machine (ATM). In particular, the invention relates to a low cost ATM.

An ATM is expensive to buy and to maintain. One of the reasons that ATMs are so expensive to buy is that they are secure devices that require high levels of:

(1) physical security (such as a safe) to store currency and other valuable media, and (2) electronic security (such as DES Data Encryption Standard encryption and associated cryptographic devices) to ensure that a customer's PIN (personal identification number) is not compromised when conveyed between modules in the ATM or outside the ATM to an authorization center.

ATMs also require expensive user interfaces. Typical ATMs include a large display and one or more loudspeakers for presenting visual and audible information to a user. Typical ATMs also include an encrypting PIN keypad and function display keys (FDKs) to allow a user to enter selections and transaction details.

A further factor that increases the cost of an ATM is that the ATM requires highly reliable telecommunications links to enable it to communicate with a remote authorization center for authorizing transactions requested by users. Typically ATMs are either:

(1) connected to a dedicated ATM network through which transaction information is routed; or (2) connected to a public telephone network via a modem within the ATM, so that the ATM dials a telephone number of an authorization center when a transaction requires authorization.

In addition to increasing the cost of buying an ATM, the requirement for reliable telecommunications links also increases the cost of running the ATM. The need for reliable telecommunications links also limits the possibility of locating the ATM in areas which do not have a reliable telecommunication infrastructure, or in locations that are not well-suited to a connection to a fixed-point telecommunications line, such as trains or other vehicles.

SUMMARY OF THE INVENTION

It is among the objects of one or more embodiments of the present invention to obviate or mitigate one or more of the above disadvantages or other disadvantages associated with prior art self-service terminals.

According to a first aspect of the invention there is provided a self-service terminal characterized in that the terminal comprises: a communication port for interfacing with a user's portable electronic device and for receiving a transaction authorization therefrom; and an authorization approval facility for approving a requested transaction in the event of the transaction authorization meeting a predetermined acceptance criterion; whereby the terminal is operable to receive a requested transaction from a user's device and to fulfil the requested transaction without the terminal preparing an authorization request.

The terminal may further comprise a dispenser for dispensing items; whereby the terminal is operable to receive a requested transaction from a user's device and to dispense an item to fulfil the requested transaction without the terminal preparing an authorization request.

The dispenser may dispense physical items, such as banknotes, tickets, coupons, money orders, or such like. Alternatively or additionally, the dispenser may dispense virtual items, such as data. The data may be dispensed in electronic, optical, magnetic or such like format. The data may be in a format suitable for being executed as a program or application on the user's device, or may convey information to the user.

The terminal may further comprise a storage area for receiving an item inserted by a user; whereby the terminal is operable to receive a requested transaction from a user's device and to receive an item from a user as part of the requested transaction without the terminal preparing an authorization request. The terminal may credit funds to a user's account if the received item is a financial instrument, such as a check, money order, or such like.

The storage area may be a physical receptacle for storing banknotes, checks, or other physical items. Alternatively, the storage area may be in the form of storage media (such as a magnetic disk drive) for storing electronic items (such as data uploaded from a user's portable device to the terminal).

By virtue of this aspect of the present invention, a self-service terminal is provided that does not require any telecommunications links (such as a network connection) because the terminal does not obtain authorization from any device outside itself. The terminal does not require any user interface (screen, encrypting PIN keypad, and such like) as all information is sent from and to the portable electronic device. The terminal does not need access to any network, as the portable device obtains authorization itself. As a result, the terminal is inexpensive and can be located anywhere, provided an electronic device can establish a communication there.

The requested transaction may consist of the transaction authorization, so that only the transaction authorization is transmitted to the terminal. Alternatively, the requested transaction may comprise the transaction authorization and additional information. The additional information may be used to reduce the possibility of fraud.

The communication port may be a wireless communication port, such as an infra-red (IR) port, a radio-frequency (RF) port, or such like. An IR port may be an IrDA (infra-red data association) compliant port. An RF port may be a Bluetooth (trade mark) port, or such like. Alternatively, the port may be a physical cradle into which the user's portable device couples, so that the device docks in the port.

The user's portable device may be a cellular radiotelephone, a personal digital assistant (PDA), an Internet access device, or such like.

Preferably, the user's portable device includes a telecommunications link so that the portable device can dial a telephone number associated with an authorization center for authorizing a transaction. Alternatively, but much less preferred, the user's portable device may not include any telecommunications links, each transaction being pre-authorized at an authorization site that connects to an authorization center.

The dispenser may be, for example, a cash dispenser for dispensing banknotes; a ticket dispenser for dispensing tickets, coupons, or other media; or a commodity dispenser for dispensing a commodity item, such as an integrated circuit for use in a cellular phone; or such like.

The authorization approval facility may be a cryptographic device comprising a cryptographic processor, a secure memory, and an encryption/decryption algorithm. The authorization approval facility may be implemented by an encrypting keypad, so that the keypad is used to examine and authorize a requested transaction.

The predetermined acceptance criterion may include the presence of a signature and/or a certificate issued by an authorization authority, so that the authorization approval facility examines the transaction authorization to determine if a signature and/or certificate is present.

The terminal may store each transaction authorization for proving that a transaction was executed.

The terminal may be an ATM. Alternatively, the terminal may be a dispensing kiosk or a kiosk for receiving items from a user, where the items may be physical (such as tickets, coupons, or such like) or virtual (data stored in electronic, optical, magnetic, or such like format).

According to a second aspect of the present invention there is provided a portable electronic device having a telecommunication link, characterized in that the device includes a user interface for entering a transaction, an authorization request facility for preparing an authorization request including details of the entered transaction, and a communication port for interfacing with a self-service terminal; whereby, the device is operable to transmit an authorization request to a remote authorization center, to receive a transaction authorization therefrom, and to transmit the transaction authorization to a terminal for fulfilling the prepared transaction.

The portable device may execute a transaction using the following steps:

(1) dialing the telephone number of a remote authorization center, (2) transmitting an authorization request including an identifier and a requested transaction (which was pre-entered by the user) to the authorization center, (3) receiving a transaction authorization (in the form of an electronic token) from the authorization center to indicate that the requested transaction has been authorized, and (4) transmitting the transaction authorization (electronic token) to the terminal.

The ATM receives this authorization token, examines the token to ensure that it is authentic (this may involve reading a digital signature and/or a digital certificate stored in the token), stores the token in a secure memory, and dispenses the requested cash (or other item).

The identifier in step (2) includes details of the user's account, and may also include details of the portable device and/or the terminal at which the transaction is to be executed.

Each terminal may have a unique code. The code may be transmitted electronically to the portable device via the communication port.

The code may include a digital signature unique to the terminal. The code may also include time/date information relating to when the code was transmitted to the portable device. In some embodiments, the authorization center may only authorize an authorization request if the request includes a valid terminal identification, recent time/date information, and the signature associated with the identified terminal.

The authorization request facility may be operable to include details of the transaction requested and/or an expiry time and/or date for the transaction, in addition to an authorization for the transaction.

The authorization request facility may be operable to include details of a specific terminal on which the transaction may be executed. This has the advantage that users will typically only authorize a transaction when in the vicinity of a terminal, thereby avoiding the problem of a user carrying a pre-authorized transaction on his/her portable electronic device.

The authorization request facility may be operable to include details specific to the user's portable electronic device, so that only that device can be used to execute the authorized transaction. This has the advantage of avoiding or at least reducing the possibility of fraud, for example by replay attacks.

An institution may provide a user with software for installing on the user's portable device so that the telephone number of the institution's authorization center is dialed each time a transaction is to be authorized. The institution's authorization center may be operated by the institution; alternatively, the institution may have a partner agreement with the authorization center.

Each terminal may have an assigned telephone number (which may be displayed prominently on a visual display or on a label attached to the terminal) so that the portable device can obtain a transaction authorization by dialing this number. The number may be transmitted from the terminal to the portable device via the communication ports.

According to a third aspect of the present invention there is provided a system comprising the terminal of the first aspect of the invention in communication with the portable device of the second aspect of the invention.

According to a fourth aspect of the present invention there is provided an authorization request facility for executing on a portable electronic device, the facility being operable to prepare an authorization request including details of an entered transaction for transmission to a self-service terminal.

According to a fifth aspect of the invention there is provided a public access docking terminal for a portable electronic device, the docking terminal being operable to extend the functionality of the portable terminal, and to provide services on receipt of a transaction authorization communicated from a portable electronic device to the terminal.

The docking terminal may require the portable device to be physically coupled thereto. Alternatively, the docking device may require the portable device to be in wireless communication thereto.

It will now be appreciated that the above aspects of the invention have the advantage that a terminal does not transmit a transaction for authorization: the user's portable device obtains authorization from a remote center and the terminal validates the authorization locally. This greatly reduces the cost of owning and maintaining a terminal such as an ATM, particularly as the user interface on a terminal can be very simple because a user enters a transaction on his/her own user interface (on the portable electronic device). The cost of maintaining such a terminal is also reduced because there are no telecommunications costs associated with each transaction.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
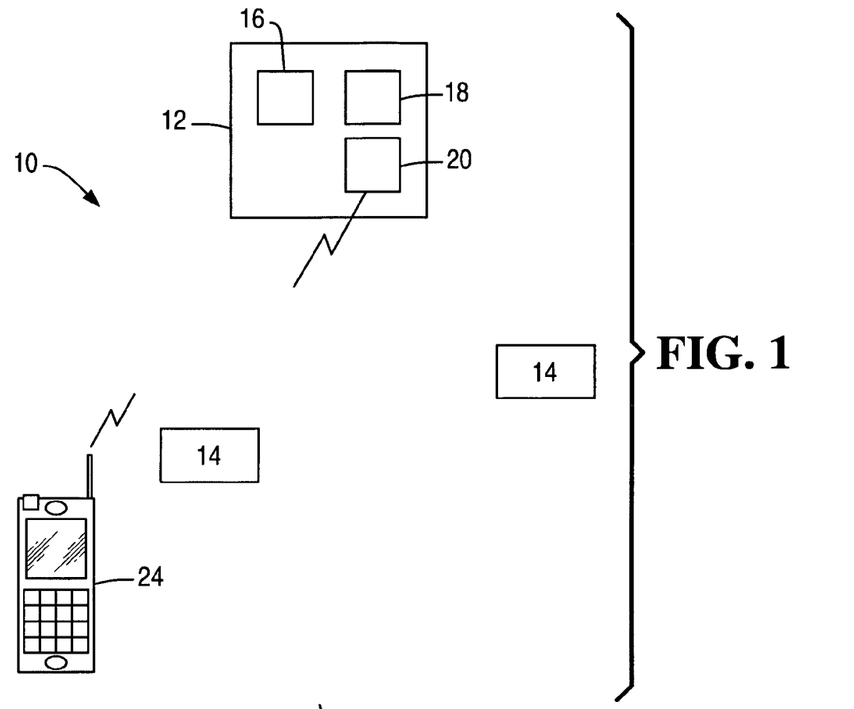
FIG. 1 is a block diagram of a self-service terminal system in accordance with one embodiment of the invention.

Referring now to FIG. 1, which is a block diagram of a self-service terminal system 10 in accordance with one embodiment of the present invention, the system 10 comprises an authorization center 12 and a plurality of SSTs 14 (only two of which are shown) which are ATMs.

The center 12 includes an authorization facility 16 for authorizing an authorization request, a back-office facility 18 for recording transactions and other administrative functions, and a telecommunication link 20 for receiving and transmitting authorization information. The ATMs 14 are not connected to the authorization center 12, and do not include any telecommunications facility.

FIG. 1 also shows one type of portable electronic device 24 in the form of a GSM cellular radiotelephone (hereinafter referred to as a cellphone; GSM is an industry acronym for "Global System for Mobile Communication") in the vicinity of one of the ATMs 14. Suitable GSM cellphones include the Nokia (trade mark) 7110 cellphone.

Figure 2:
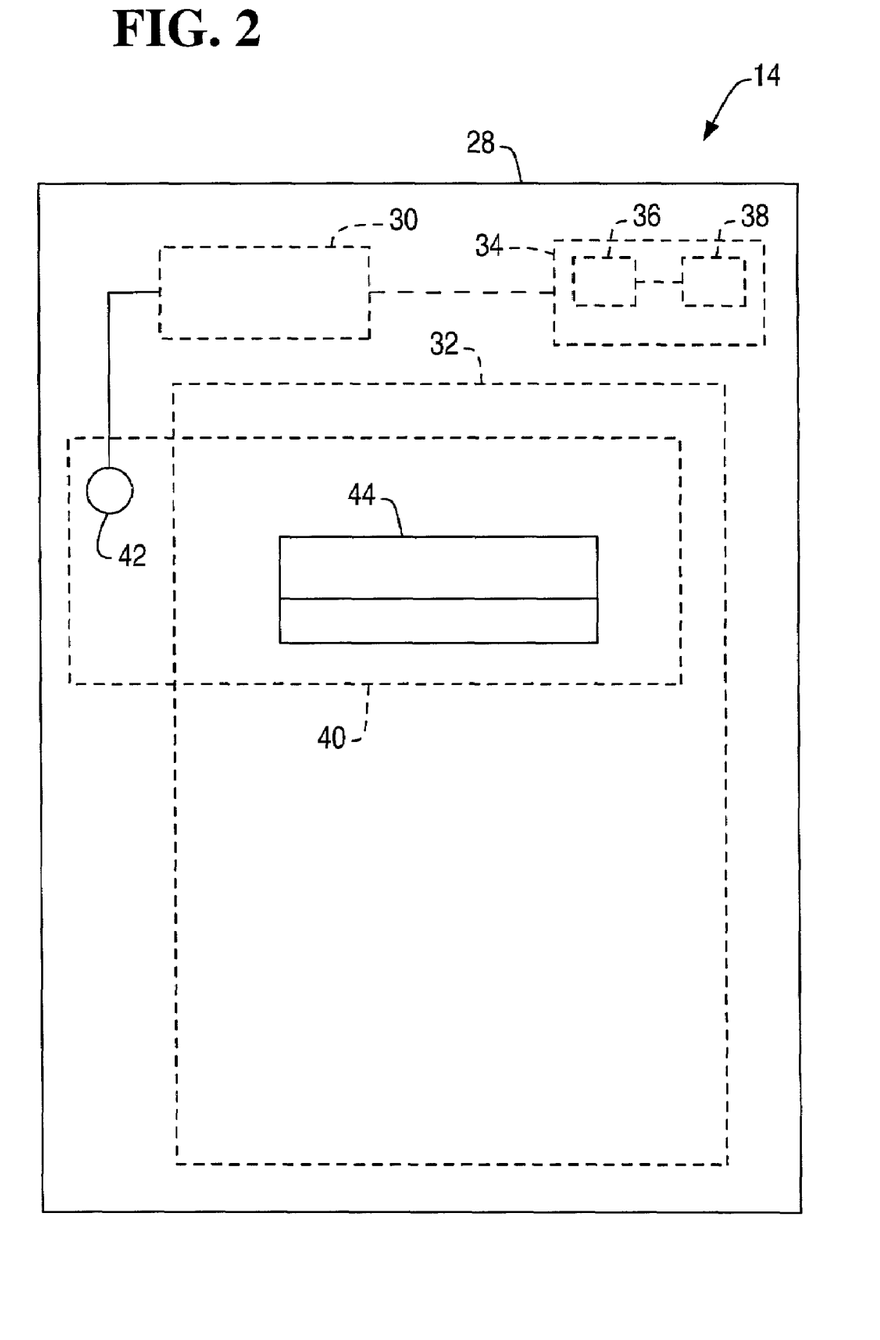
FIG. 2 is a schematic front view of a terminal of FIG. 1.

FIG. 2 is a schematic diagram of one of the ATMs 14 of FIG. 1. The ATM 14 has a safe 28 housing a processing module 30 (shown in broken line) coupled to a dispenser 32 (shown in broken line) and an approval facility 34 (also shown in broken line). The processing module 30 includes volatile and non-volatile memory (not shown). The dispenser 32 is a cash dispenser. The approval facility 34 is in the form of a cryptographic device that includes a cryptographic processor 36 and a secure memory 38.

The ATM 14 has a simple user interface 40 comprising a communications port 42 coupled to the processor 30, and a dispense area 44 in the form of a tray for receiving bank notes. The port 42 is a wireless IR port in the form of an IrDA-compliant module for receiving and transmitting information in infra-red format.

Figure 3:
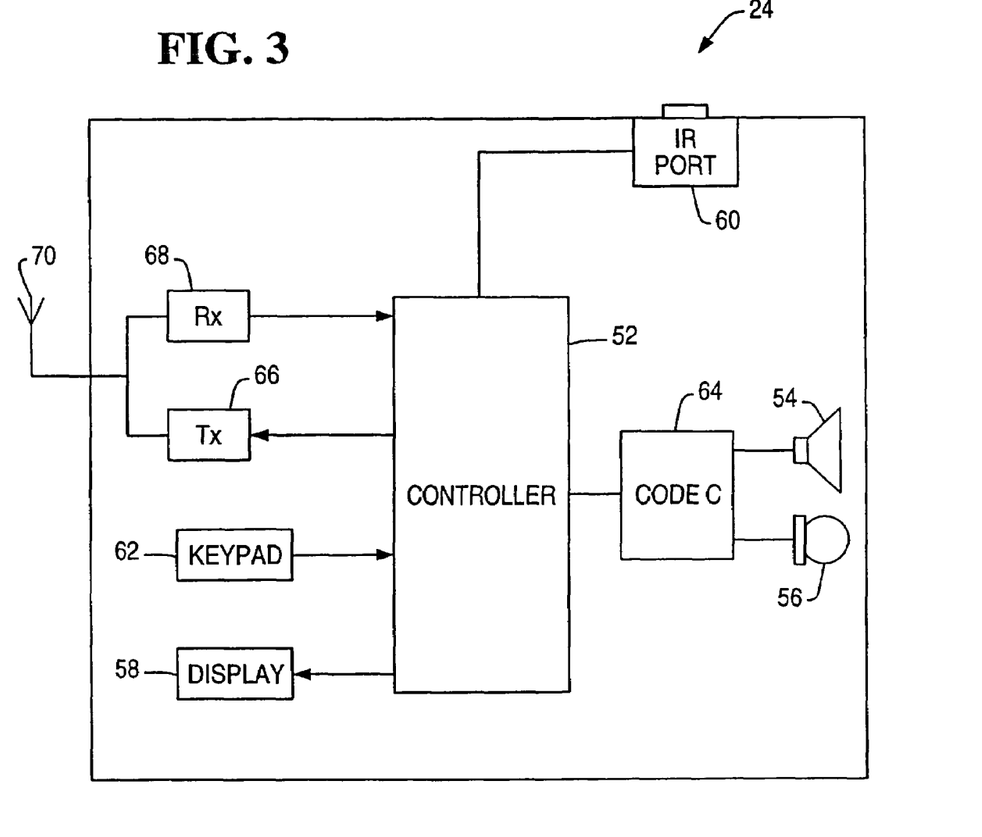
FIG. 3 is a block diagram of the portable electronic device of FIG. 1.

FIG. 3 illustrates the architecture of cellphone 24. Cellphone 24 comprises a controller 52, a loudspeaker 54, a microphone 56, a graphical display 58, a wireless communication port 60 in the form of an IrDA-compliant infra-red port, a keypad 62, a coder/decoder (codec) 64, an RF transmitter circuit 66, an RF receiver circuit 68, and an external antenna 70.

Figure 4:
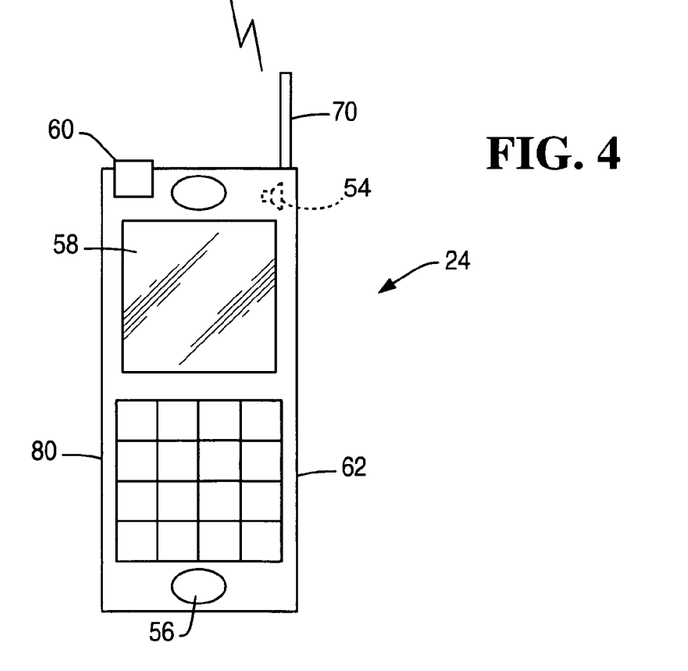
FIG. 4 is a schematic view of the portable device of FIG. 3.

FIG. 4 is a schematic view of the cellphone 24, which has a body 80 housing the loudspeaker 54 (shown in FIG. 3), the microphone 56 (shown in FIG. 3), keypad 62, the graphics display 58, the antenna 70, and the IrDA port 60.

Figure 5:
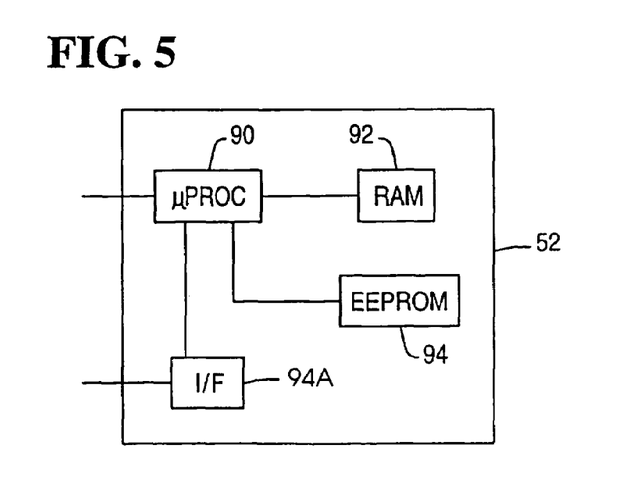
FIG. 5 is a block diagram of a controller in the device of FIG. 3.
Figure 6:
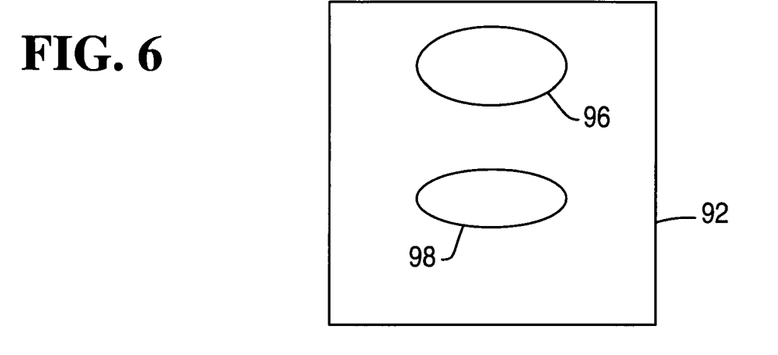
FIG. 6 is a block diagram of a memory in the device of FIG. 3.

Referring to FIGS. 5 and 6, the controller 52, which is responsible for the operation of the device 24 (shown in FIG. 3), comprises a microprocessor 90, a volatile memory 92, a non-volatile memory 94, and an interface, I/F, 94A for outputting and for receiving control signals.

As is known to those of skill in the art, the non-volatile memory 94, which may be EEPROM (Electrically Erasable Programmable Read Only Memory), stores the control programs 96 (FIG. 6) required for radio communication and for controlling the port 60. When a user of the cellphone 24 activates a control switch (not shown), the cellphone 24 executes a routine in the control programs 96 for transmitting and receiving signals via the port 60.

As is also known to those of skill in the art, the volatile memory 92, which may be RAM (Random Access Memory), records transmission and reception control information required for radio communication, including dial information.

The microprocessor 90 of FIG. 5 uses the stored control programs 96 of FIG. 6 to execute control processes relating to radio communication.

In use, the microprocessor 90 of FIG. 5 loads the required control programs 96 of FIG. 6 from the EEPROM 94 of FIG. 5 into the RAM 92. The microprocessor 90 also loads an authorization request facility in the form of an ATM transaction program 98 from the EEPROM 94 into the RAM 92.

The transaction program 98 provides a user of the cellphone 24 with a user interface for preparing transactions for executing on the ATM 14 and also provides an encryption/decryption facility for encrypting any transactions to be transmitted or stored. The transaction program also includes a unique identifier.

Figure 7:
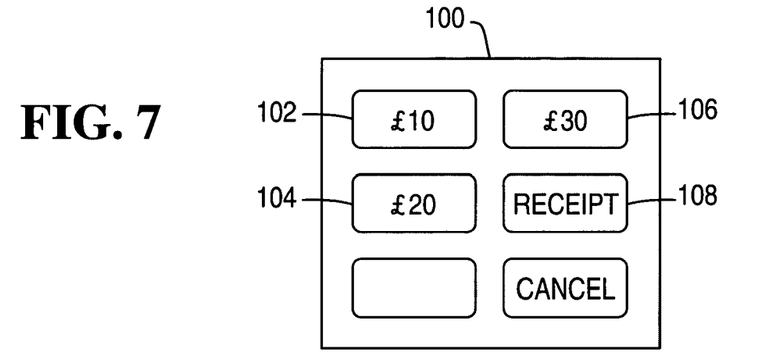
FIG. 7 is a pictorial representation of the display of the device of FIG. 3 during preparation of a transaction.

When the transaction program 98 is selected by a user of the cellphone 24, the cellphone 24 displays a series of screens in a similar way to a conventional ATM display. A typical screen 100 is shown in FIG. 7, which shows various cash withdrawal options, such as ten pounds 102, twenty pounds 104, thirty pounds 106, and a download receipt option 108. The sequence of screens and the content of each screen may be customized by the user. As the user carries his/her own graphical user interface, no graphical user interface is required on ATM 14.

Figure 8:
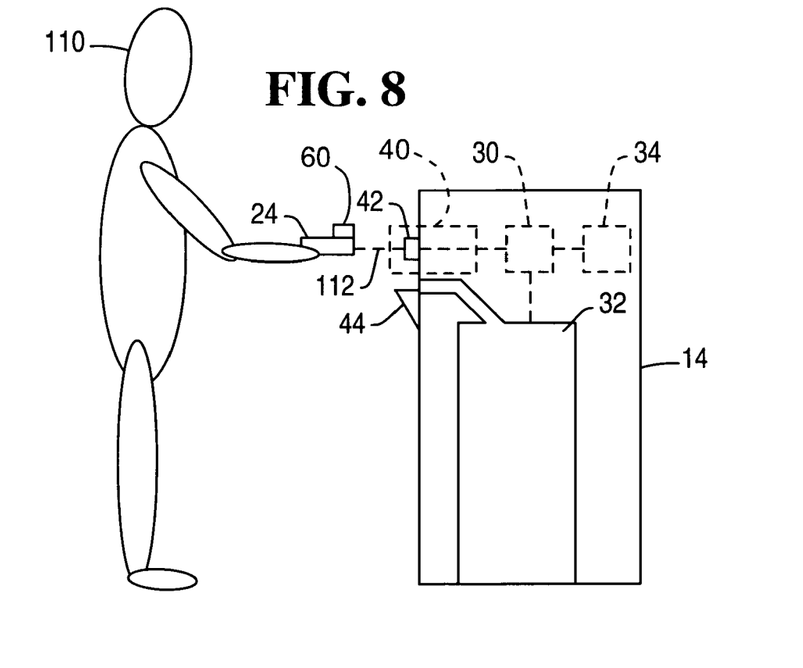
FIG. 8 is a schematic diagram illustrating a user operating the portable device of FIG. 3 in the vicinity of the terminal of FIG. 1.
Figure 9:
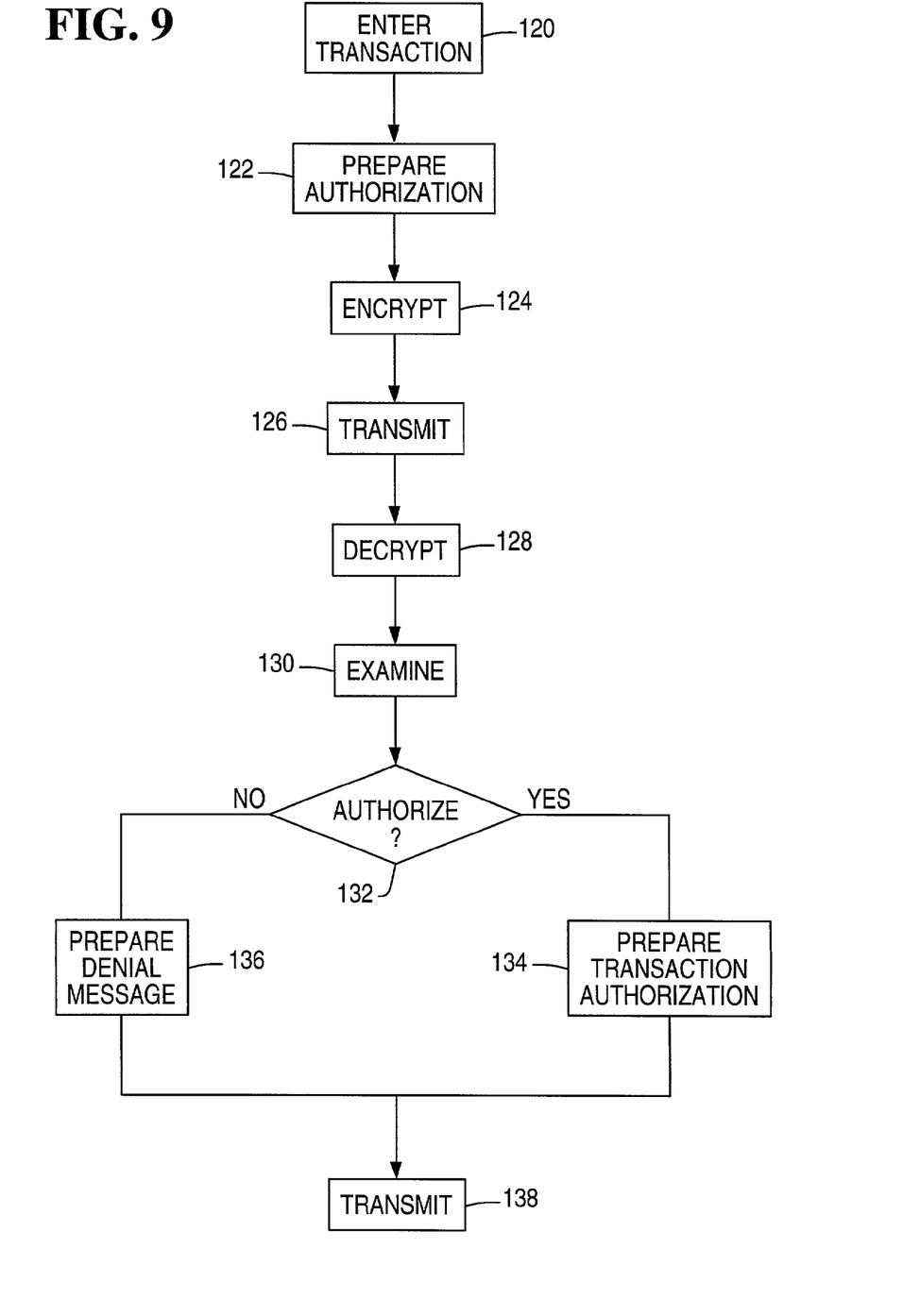
FIG. 9 is a flowchart illustrating the steps involved in obtaining a transaction authorization.

Referring now to FIGS. 8 and 9, when a user 110 wishes to withdraw cash from ATM 14, the user 110 executes the transaction program 98 (FIG. 3) on his/her cellphone 24, and prepares a transaction (step 120 in FIG. 9). The user 110 prepares a transaction by entering his/her PIN using display 58 (FIG. 3) and selecting an option representing an amount to be withdrawn, such as twenty pounds (104 in FIG. 7). The transaction can be prepared remotely from the ATM 14 or in the vicinity of the ATM 14.

The controller 52 uses transaction program 98 to prepare an authorization request (step 122) that includes the user's account details, the user's PIN, the unique transaction program identifier, and the prepared transaction requested (withdraw twenty pounds).

The controller 52 then encrypts the authorization request (step 124) using the encryption facility in the transaction program 98. The encryption facility uses a public key issued by the authorization center 12 (FIG. 1).

The cellphone 24 then transmits the request (step 126) by dialing a telephone number associated with the telecommunications link 20 in the authorization center 16 (FIG. 1). This telephone number may be stored in the cellphone's electronic address book, in the ATM transaction program 98, or may be entered into the keypad 62 manually by the user 110.

Once the cellphone 24 has established a link with the authorization center 12, the cellphone 24 conveys the authorization request to the center 12.

On receiving the authorization request, the authorization facility 16 decrypts (step 128) the request (using the authorization center's private key) and examines (step 130) the decrypted request to determine (step 132) whether:

(1) the user's PIN matches the users claimed identity (based on the account details), and (2) the user 110 has sufficient funds to cover the requested transaction.

If these conditions (1 and 2 above) are met, then the authorization facility prepares (step 134) a transaction authorization message.

If these conditions (1 and 2 above) are not met, then the authorization facility prepares (step 136) a transaction denied message.

The transaction authorization is a digitally signed authorization for the user 110 to withdraw twenty pounds from the account number contained in the authorization request. The transaction authorization also includes the unique transaction program identifier. The use of digital signatures to authenticate data is well known to those of skill in the art.

The telecommunications link 20 then transmits (step 138) the appropriate message (transaction authorization or transaction denied) to the cellphone 24.

If the cellphone 24 receives a transaction denied message then this is displayed to the user 10 on the display 58.

If the cellphone 24 receives a transaction authorization, then the user 110 may execute this at ATM 14.

To execute this transaction, the user 110 approaches ATM 14 and aligns the port 60 (FIG. 3), which may take the form of an IR port, with the communications port 42 in FIG. 2 and 8, also called an IRDA port, in the user interface 40 in FIG. 2 of the ATM 14 of FIG. 2.

The user 110 transmits the received transaction authorization and the unique transaction program identifier to the ATM 14 using the IR port/communication port 60 and communications port/IRDA port 42, as illustrated by broken line 112.

On receiving the transmitted data (transaction authorization and unique identifier), the IrDA port 42 conveys the transmitted data to the cryptographic device 34 via the processor 30. The cryptographic device 34 examines the transaction authorization and decrypts the signature using the authorization center's public key to ensure that the transaction authorization meets a predetermined acceptance criterion, in this embodiment, the acceptance criterion is twofold:

(1) that the authorization has not been modified, and (2) that the unique identifier contained in the transaction authorization matches the unique identifier transmitted with the transaction authorization.

If the transmitted data meets this acceptance criterion then the transaction is fulfilled by the ATM 14 dispensing twenty pounds to the dispense tray 40 for collection by the user 110.

The ATM 14 stores the transaction authorization in non-volatile memory (not shown) in the processor 30 (or the cryptographic device 34) for reconciliation and audit purposes. The ATM 14 also transmits confirmation of the transaction to the cellphone 24 via ports 42 and 60.

If the transaction authorization is not validated, for example because the authorization has been modified, then the processor 30 transmits a message to the cellphone 24 to inform the user 110 that the transaction cannot be fulfilled. This provides the user 110 with feedback relating to the status of the transaction.

Various modifications may be made to the above described embodiment within the scope of the invention, for example, in other embodiments, the electronic device may be a PDA, an Internet access device, or such like. In other embodiments, each electronic device may have a unique identifier that is used to stop a third party intercepting the transaction authorization from the authorization center and executing the transaction using a different electronic device to that used by the user. In other embodiments, different authorization and security techniques (for example, different encryption techniques) may be used than those described above. In other embodiments, the portable device may physically couple to the ATM and data may be transmitted through a physical connector. In other embodiments, items other than banknotes may be dispensed. In other embodiments, the self-service terminal may include a storage area for receiving items from a user; such a storage area may be used in addition to or instead of the dispenser. In other embodiments, the terminal may include a display and/or an encrypting keypad. In other embodiments, the terminal may be a conventional terminal having been retrofitted with a communications port and a program to allow the terminal to receive a transaction authorization from a portable device. In other embodiments, the portable device may store a series of transactions that have transaction authorizations associated with them. In other embodiments, fulfilling a transaction may involve allowing a user to use one or more of the facilities provided by the terminal, for example, a printing facility, a display, or such like. The terminal may also provide some form of identity validation for the user.

What is claimed is:

1. A method of operating an automated teller machine (ATM), the method comprising:

a) receiving from a portable device carried by an ATM customer a request to conduct an ATM transaction at the ATM;

b) receiving from the portable device carried by the ATM customer a transaction authorization message which is associated with the requested ATM transaction and which the ATM customer has obtained from an authorization center of a financial institution before making the requested ATM transaction at the ATM and in connection with the requested ATM transaction;

c) examining the transaction authorization message which has been received from the portable device carried by the ATM customer to determine if the transaction authorization message is valid; and d) executing the requested ATM transaction without obtaining any additional transaction authorization message from an authorization center of a financial institution when the transaction authorization message received from the portable device carried by the ATM customer is determined to be valid.

2. A method according to claim 1, in which the determination of whether the transaction authorization message is valid as in paragraph (c) comprises determining whether said message has been modified.

3. A method according to claim 1, further comprising:

receiving from the portable device carried by the ATM customer a unique transaction program identifier which is associated with the requested ATM transaction.

4. A method according to claim 3, wherein examining the transaction authorization message includes:

comparing a unique transaction program identifier contained in the transaction authorization message with the unique transaction program identifier received from the portable device carried by the ATM customer;

determining that the transaction authorization message is valid when the unique transaction program identifiers match; and determining that the transaction authorization message is invalid when the unique transaction program identifiers are unmatched.

5. A method of operating an automated teller machine (ATM), the method comprising:

a) receiving from a portable device carried by an ATM customer a request to conduct an ATM transaction at the ATM;

b) receiving from the portable device carried by the ATM customer a transaction authorization message which is associated with the requested ATM transaction and which the ATM customer has obtained from an authorization center of a financial institution before making the requested ATM transaction at the ATM and in connection with the requested ATM transaction;

c) examining the transaction authorization message which has been received from the portable device carried by the ATM customer to determine if a unique transaction program identifier contained in the transaction authorization message has been modified; and d) executing the requested ATM transaction without obtaining any additional transaction authorization message from an authorization center of a financial institution only when a determination is made that the unique transaction program identifier contained in the transaction authorization message has not been modified.

* * * * *

UNITED STATES PATENT AND TRADEMARK OFFICE
CERTIFICATE OF CORRECTION

PATENT NO. : 7,637,420 B2  Page 1 of 1
APPLICATION NO. : 09/848003
DATED : December 29, 2009
INVENTOR(S) : Haley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2716 days.

Signed and Sealed this

Twenty-first Day of December, 2010

David J. Kappos
*Director of the United States Patent and Trademark Office*